United States Patent [19]
Mulford

[11] Patent Number: 5,249,304
[45] Date of Patent: Sep. 28, 1993

[54] ACCESS AND CONTROL SYSTEM FOR A DIGITAL QUEUED REPEATER

[75] Inventor: Keith I. Mulford, Arlington Hts., Ill.

[73] Assignee: Motorola, Inc., Schaumburg, Ill.

[21] Appl. No.: 590,861

[22] Filed: Oct. 1, 1990

[51] Int. Cl.⁵ ............................................. H04B 7/00
[52] U.S. Cl. ................. 455/34.1; 455/54.1; 455/57.1; 455/58.2
[58] Field of Search ............. 455/34, 35, 53, 54, 455/57–58, 70, 79, 166; 340/825.5; 375/3–4

[56] References Cited

U.S. PATENT DOCUMENTS

| | | | |
|---|---|---|---|
| 4,013,959 | 3/1977 | Patterson | 455/58 |
| 4,517,561 | 5/1985 | Burke et al. | 455/58 |
| 4,573,207 | 2/1986 | Smith et al. | 455/54 |
| 4,788,543 | 11/1988 | Rubin | 455/58 |

Primary Examiner—James L. Dwyer
Assistant Examiner—Andrew Faile
Attorney, Agent, or Firm—Jon P. Christensen

[57] ABSTRACT

A system for allocating communication resources in a communication system where only a single frequency pair may be available for use by many users. A system wherein a resource controller transmits control information on a resource to many potential users without disrupting use of the resource by a primary user.

2 Claims, 3 Drawing Sheets

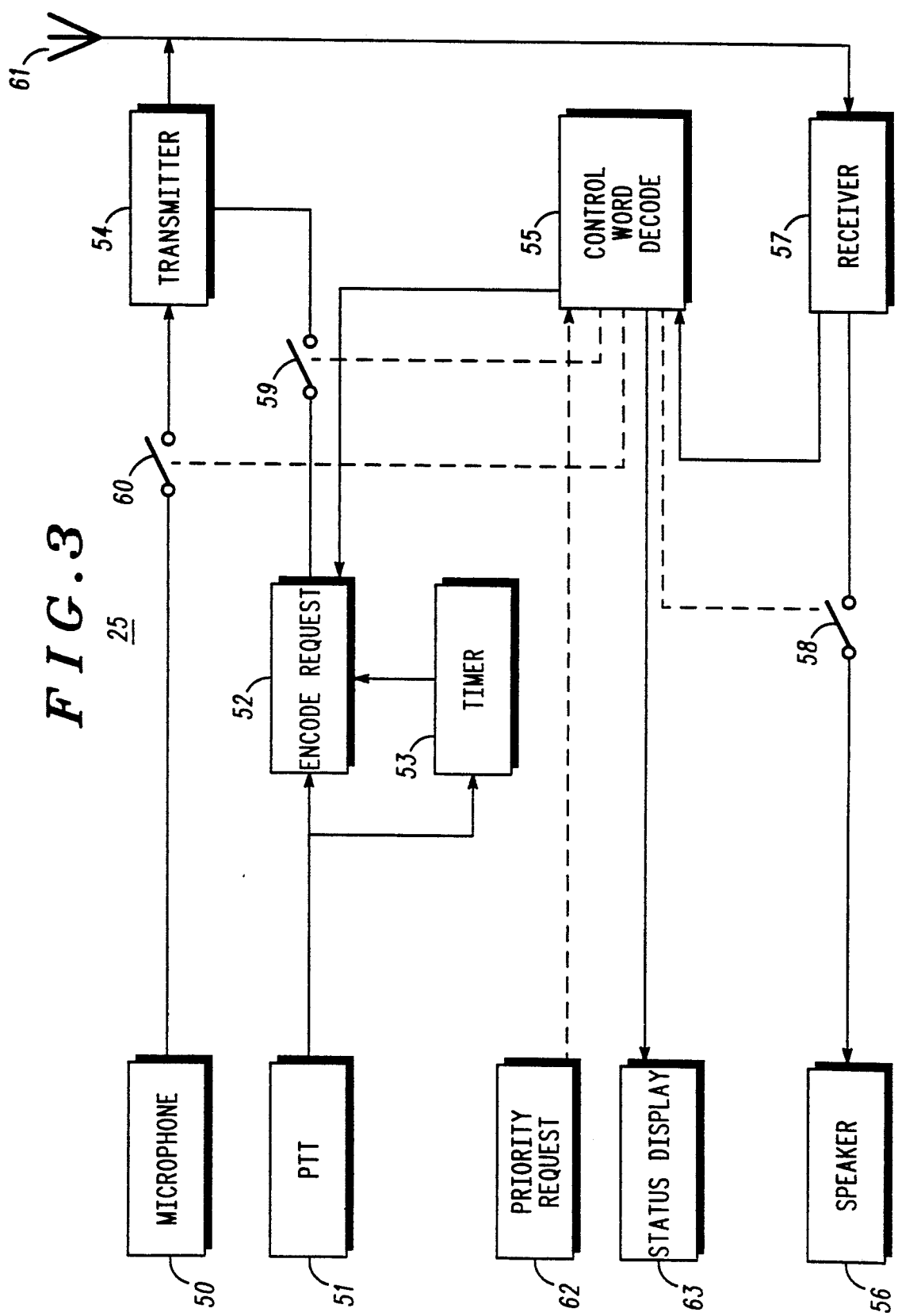

ACCESS AND CONTROL SYSTEM FOR A DIGITAL QUEUED REPEATER

TECHNICAL FIELD

This invention relates generally to communication systems and more specifically to dispatch communication systems.

BACKGROUND

Dispatch non-trunked communication systems are known. Such systems typically consist of a central repeater and a number of mobile communication units operating on a pair of frequencies over a relatively large geographic area. The communication units using such a system occasionally belong to a single operating group but more often belong to a number of groups.

When a member of a group desires use of such a system he keys his microphone and begins speaking. If a second user were to desire use of the system he must wait for the first user to finish. If the second user were to begin speaking without waiting for the first user to finish there would be an interference of signals. The strongest signal received at the repeater would be re-transmitted. The weaker signal would be lost.

Targets of such transmissions normally receive transmissions only from other members of the same group. Targets recognize transmitted messages from other members through the inclusion of an identification tone or code transmitted along with the signal.

The receiver within a target communication unit is constructed to recognize specific identification tones or codes transmitted from other members his group and to be able to discriminate between that tone and tones assigned to other groups. A receiver will activate (unmute) only upon receipt of the tone or code assigned to his group.

The tone assigned to a group typically consists of a frequency below three-hundred hertz. Communication units filter the tone out of the reproduced audio signal. The result is that a target unit activates on receipt of the transmitted tone but the target user does not hear the tone.

In use a target user will hear only transmissions from other members of the his group. As such a user may not even be aware of use of the system by other groups. If a user, on the other hand, should desire to use the system (transmit a message), then use by other groups must be considered and a call potentially delayed. For the former user to detect other users he must first manually un-mute his radio and listen for other users. If the system is not being used then he may transmit. If, in the interim, another group has begun transmitting then the former user must wait.

Problems often arise on such a system because of an inability of users to anticipate or detect other users. A transmission by one member of a group may require a response from another member of the group. The other member, on the other hand, may be busy or may be slow in providing a response. Because of the delay another user, thinking that the previous transaction has ended, may begin transmitting. If the previous target, should now respond the result is contention for use of the system. Where contention exists for channel use the result is often missed or lost messages.

Another problem arises in the lost time spent monitoring the system by potential users. During times of heavy use considerable time may be consumed waiting for a clear channel.

Further problems may arise due to the lack of privacy of such systems. Occasionally information of a sensitive nature must be communicated to members of a group. Because other groups must monitor the system to affect usage a transmitting party is never certain who receives the transmitted information.

Because of the inherent problems and inefficiencies associated with the use of non-trunked dispatching systems a better method is needed to control resource allocations between talk groups.

SUMMARY OF THE INVENTION

Pursuant to one embodiment of the invention mobile communication units are constructed to transmit control and/or audio information over a common transmitter located within the communication unit. The inputs to the transmitter for control and/or audio information may be selectively enabled or disabled from a central resource controller. Control is asserted from the resource controller by the transmission of digital control words to a control receiver within communication units.

The receiver within the mobile communication unit is similarly constructed except that the control receiver within communication units is not disabled. Audio information, on the other hand, may be disabled (muted) within the communication unit by the central controller.

Two-way transmission of control words between the resource controller and communication units may occur in the form of full channel transmissions or in the form of embedded signalling inserted into signals passing through a repeater. Signals transmitted from a communication unit to the resource controller are transmitted in the form of a full channel signal. Signals transmitted from the resource controller to communication units are also transmitted in the form of full channel signalling unless the communication resource has been previously allocated. If the communication resource has been allocated then control information is transmitted from the resource controller to communication units in the form of embedded signalling.

Upon activation of a communication unit the control input to the transmitter is enabled and the audio input to the transmitter is disabled. The audio portion of the receiver is muted. When the operator of a communication unit should desire to transmit a message and the system is not busy then the operator presses a push to talk (PTT) button on the communication unit and begins transmitting.

Upon activation of the PTT button the requesting communication unit transmits a resource request in the form of a control word to the resource controller through a full channel signal. Audio information cannot yet be transmitted since the audio input is disabled. The resource controller receives the request and inserts an ID of the requesting communication unit into a queue within the resource controller. The resource controller also transmits a control word back to the communication unit disabling the control input to the transmitter thereby preventing re-transmission of the resource request.

When the requesting communication unit reaches the head of the queue (becomes first requesting communication unit) the resource controller transmits a control word to the requesting communication unit enabling the audio and control inputs to the transmitter. At the same time the resource controller transmits control information disabling audio and control inputs on communication units within other groups and un-muting the receivers within target communication units. The requesting communication unit subsequently begins transmitting an audio message subsequently received by target communication units.

Upon release of the PTT button within the requesting communication unit the resource controller transmits control information to selected receivers serviced by the resource controller enabling the control transmitters. Enabling the control inputs allows for the transmission of resource requests from other communication units and the subsequent inclusion of received requests into the queue within the resource controller.

After a short period of time has elapsed, the control inputs to the selected transmitters are disabled. Other members belonging to the same group (the allocated group) as the first requesting communication unit may now respond and the conversation may continue. As each communication unit releases the PTT button, the resource controller again repeats the process of enabling a different select group of units (of the non-allocated groups) to transmit resource requests. During each voice/data transmission from communication units within the allocated group, the resource controller acknowledges the previously received resource requests from the selected communication units through the use of control signalling embedded within a signal from a then currently transmitting member of the allocated group. The target communication units within the allocated group do not hear the embedded control information.

Upon completion of a conversation within a communication group any member of the allocated group may signal to the resource controller that the communication resource is no longer required through the transmission of a full channel signalling word. The resource controller responds by transmitting a control word disabling the audio inputs to units within the group. A control word is also transmitted to communication units within all groups enabling the transmission of resource requests. After a period of time has elapsed to allow pending requests to be received the resource controller transmits a control word disabling the transmission of resource requests and enabling a then current first requesting communication unit and associated targets within the same group.

Pursuant to one embodiment of the invention communication units are equipped with a separate, priority PTT button. The priority PTT button is reserved for situations where a user cannot wait for system access, such as an emergency situation. Activating the priority PTT button overrides a disabled transmitter to transmit a service request to the resource controller. If because of distance a prior user generates a stronger signal and the priority request is not received by the resource controller then the activated priority PTT button causes the unit to monitor for release of the PTT button of the prior user. Upon detection of release of the PTT button of the prior user the priority requestor re-transmits a service request.

Upon receipt by the resource controller of the priority service request the resource controller immediately terminates access by the prior user. Immediate access is then provided to the communication group within which the communication unit requesting priority service is included. Status words embedded within the voice/data communications the priority group are then transmitted to prior users reflecting subordinated status.

BRIEF DESCRIPTION OF THE DRAWINGS

FIG. 3 comprises a block diagram of a communication unit.

BEST MODE FOR CARRYING OUT THE INVENTION

Figure 1:
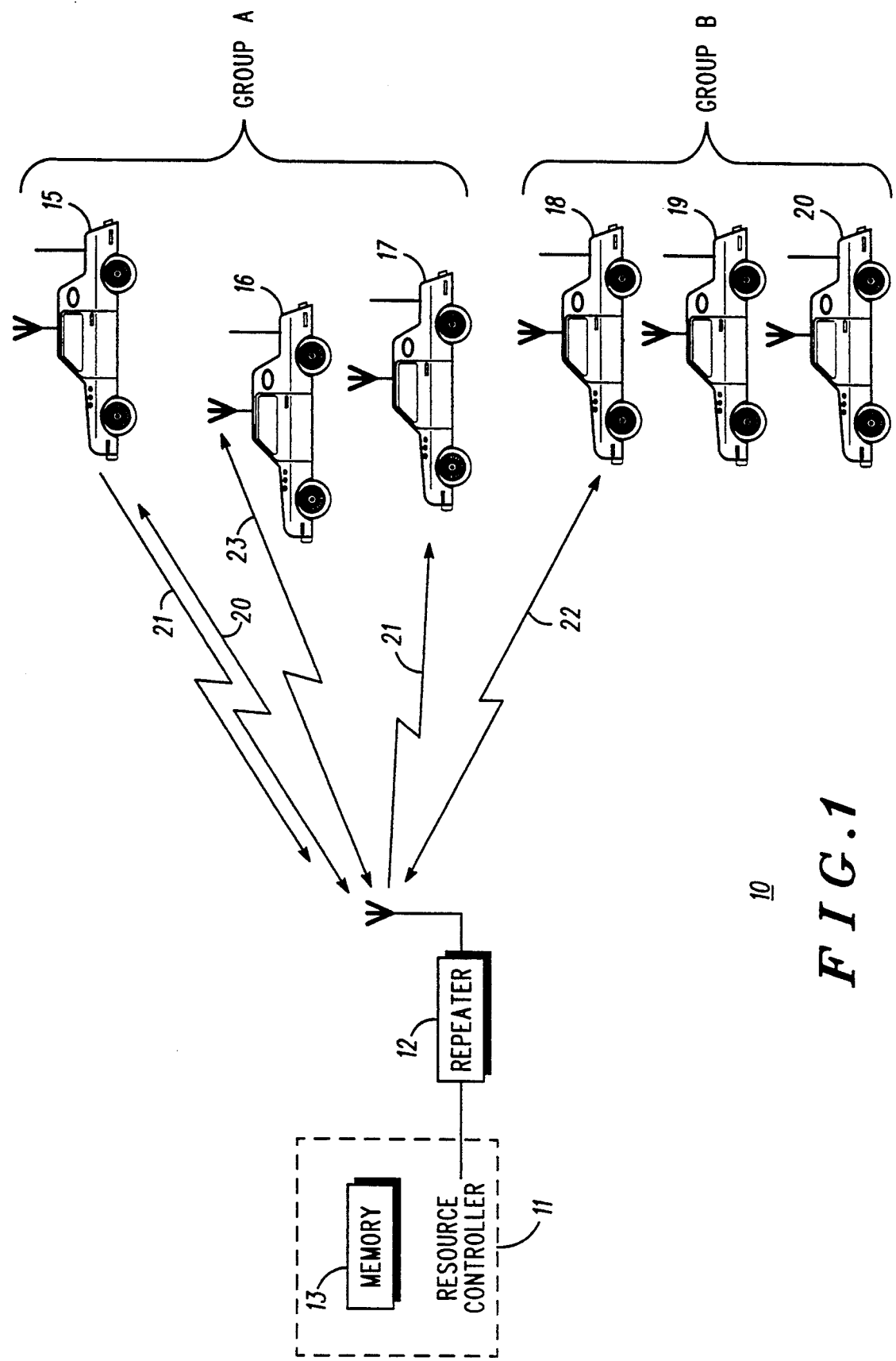
FIG. 1 comprises a block diagram of a communication system containing two communication groups.

Shown (FIG. 1) is a block diagram of a dispatch communication system generally (10). Included in the dispatch communication system is a resource controller (11), a repeater (12), a memory (13) and a number of mobile communication units (15 through 20) (as used herein "communication units" refers to mobile units, or portable units). For purposes of this discussion communications units 15 through 17 will be assumed to be in one communication group (group A) and communication units 18 through 20 will be assumed to be in another communication group (group B).

Each communication unit (15 through 20) is constructed as shown in FIG. 3 generally (25). Communication units (15 through 20) are constructed to receive control information when activated from an antenna (61). Control information is routed to a control word decoder (55). The control word decoder (55) controls the flow of audio information from a microphone (50) to a transmitter (54) through a switch (60). The control word decoder (55) also controls the transmission of control information through a second switch (59). Audio output to a communication unit speaker (56) is likewise controlled by a third switch (58). Status information relative to system operation is provided to a status display (63) from the control word decoder (55).

Upon activation of a communication unit (15 through 20) control switch 59 remains closed. The first and third switches (60 and 58), in contrast, are closed only upon receipt of appropriate control words from the resource controller (11) and decoding by the control word decoder (55).

The encode request (52) is constructed to, upon occasion, transmit through the transmitter (54) a signalling word identifying the communication unit (15 through 20) and a timer value. Upon activation of the PTT (51) the encode request (52) in conjunction with the timer (53) and transmitter (54) may be enabled to transmit a resource request to a resource controller containing an ID of the communication unit (25) and a time of activation of the PTT (51).

In general to establish a call a communication unit operator pushes the PTT button (51) on his communication unit (15). The communication unit (15), in response, transmits a resource request (20, FIG. 1) to the resource controller (11) which is received by the resource controller (11) through the repeater (12). The transmitted resource request (20) contains the ID of the communication unit (15) as well as a timer value indicating time since the PTT button was activated.

Upon receiving the resource request (20) from the communication unit (15) the resource controller (11) enters the request (20) into a request queue within the memory unit (13) based on time of PTT activation and transmits a signal (20) back to the communication unit

(15) disabling the communication unit's transmitter by de-activating switch 59. The transmitter on the communication unit (15) is disabled to prevent re-transmission of additional requests thereby allowing other communication units (possibly at a greater distance) to transmit resource requests.

When the resource request (20) from the communication unit (15) advances to the head of the request queue or is the only request in the queue, thereby becoming first requesting communication unit, then the resource controller (11) may grant access to the communication resource by the communication unit (15). In preparation for the resource grant the resource controller (11) first transmits a control word (not shown) disabling the transmitters on all communication units (15 through 20) by deactivating switch 59. The resource controller then transmits a control word (20) enabling the transmitter by activating switches 58, 59 and 60 on the requesting communication unit (15) thereby granting access to the communication resource. The resource controller also transmits a control word (not shown) to target communication units (16 and 17) within the same communication group unmuting their receivers (activates switch 58).

Communication unit (15) begins transmission of an audio message (21) which message (21) is received by the repeater (12) and re-transmitted to target communication units (16 and 17). Included within the audio message (21) from the communication unit (15) is embedded signalling used by the target units (16 and 17) to identify the transmissions as originating from a member of group A. As the audio message (21) passes through the repeater (12) additional signalling information may be inserted by the resource controller (11) for use by other communication groups (group B).

The receipt of control information by a communication unit within group B is possible because even though the communication resource is allocated to a different specific group (group A) all communication units still receive the same repeated signal. Each radio operator within group A hears the audio portion of the repeated signal because the audio portion of their communication unit is enabled. Units within group B do not hear the audio information because the audio portion of their receivers are disabled. Transmitted, embedded control information, on the other hand, is received and processed by all communication units continuously within the control word decoder (55, FIG. 3).

If during the above transmission the operator of another communication unit (19) were to desire service (activates the PTT button) the operator would hear a locally generated busy signal from the communication unit (19). The busy signal heard by the operator is generated in response to the disabled transmitter input. Even though the transmitter on the communication unit (19) is disabled, communication unit (19) internally initiates a timer (53, FIG. 3) upon activation of the PTT button in anticipation of transmission of a resource request.

After transmitting a message (21) the operator releases his PTT button and an end of transmission data word (EOT) is transmitted from the communication unit (15) to the resource controller (11). The resource controller in response transmits a control word to the communication units (18 through 20) in the next group (B) in an index sequence enabling the transmitters on all units within group B (activates switch 59 in FIG. 3). The communication resource, on the other hand, still remains allocated to group A until a communication unit (15, 16, or 17) activates a call-end button on the communication unit (15, 16, or 17) or until the expiration of a fixed time period (repeater hang time). Repeater hang time is a fixed time period during which the resource controller (11) reserves use of the system (10) for any member of the group of the prior user.

The index sequence containing the communication groups is located within the resource controller (11) and contains an ID number of each group registered within the system (in this example, group A and group B). Upon the receipt of an EOT the index sequence is advanced. By advancing through the index sequence upon receipt of each subsequent EOT a different communication group is allowed to transmit a resource request following an EOT even though the resource remains allocated to another group (A).

Communication unit (19) upon receipt of the transmitter enable command immediately transmits a resource request (22) containing its ID and the time since activation of the PTT button. The request is received by the resource controller (11) through repeater (12) and entered into the queue within memory (13) according to time of PTT activation.

If shortly thereafter (before the receipt of a call-end signal or before expiration of the repeater hang time) a transmission is received from another communication unit (16) within group A then the group A conversation would continue.

As the communication unit (16) begins transmitting an audio signal, the signal is received by the repeater (12) and re-transmitted for the benefit of the other group A communication units (15 and 17). As the audio signal passes through the repeater (12) additional signalling may be inserted into the signal. The additional signalling may be an acknowledgement of the resource request to group B communication unit (19) or may include status information relative to the resource request. The embedded signalling is received by the group B communication unit (19) even though all group B transmitters are disabled and their audio speakers muted.

The receivers on the group B communication units (18, 19 and 20), on the other hand, are active and capable of receiving control information. Included in the additional signalling (22) in addition to an acknowledgement of the resource request is a status message giving an indication of relative location in the request queue. The status information is displayed on a status display (63, FIG. 3) located on the communication unit (19), indicating that unit's relative position within the request queue. The operator of the communication unit (19) upon examining the status message may either wait for authorization to transmit or terminate the call request. If the operator decides that he cannot wait, he activates the call-end button and a cancel command is transmitted (not shown) the next time his transmitter is enabled by the resource controller.

On termination of the transmission from the group A communication unit (16) the process may be repeated by another communication unit within group A (15 or 17), or, upon receipt of a call-end or expiration of repeater hang time the resource controller (11) will grant access to the next communication unit (19) in the request queue.

After the termination of transmission of the last communication unit (19) in the request queue, the resource controller (11) will again enable the transmitters on all communication units (15 through 20). The resource controller will remain in that state until a request is received.

Figure 2:
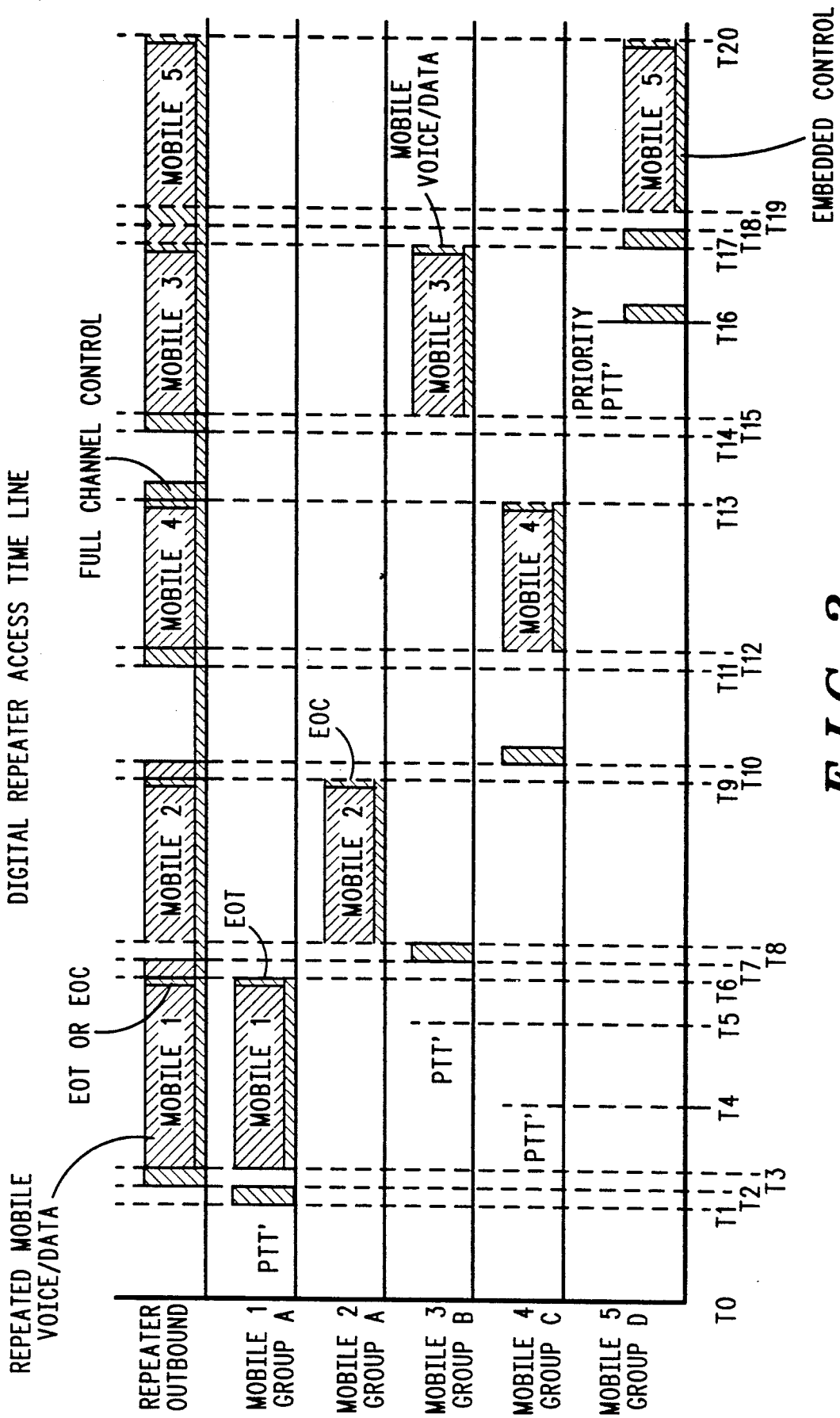
FIG. 2 comprises a timing diagram of system activity with three user groups.

Shown (FIG. 2) is an example of a timing line for a communication system containing three communication groups (A, B, C and D). Mobile 1 and mobile 2 are part of group A, mobile 3 is a part of group B, mobile 4 is a part of group C, and mobile 5 is part of group D.

At time t1 (FIG. 2) mobile 1 presses the PTT button. Since the system is inactive and all transmitters are enabled a request is immediately transmitted to the resource controller. The resource controller responds at time t2 (FIG. 2) with an enable command for the mobile 1 transmitter and the allocation of the communication resource to group A. Mobile 1 begins transmitting an audio signal at time t3 which signal is received by the repeater inbound (not shown) and re-transmitted by the repeater outbound (FIG. 2) for the benefit of mobile 2.

During the transmission by mobile 1, mobile 4 presses the PTT button (t4) followed by activation of the PTT button on mobile 3 (t5). Because of the disabled inputs to the transmitters on mobiles 3 and 4 no message is sent to the resource controller.

At time t6 mobile 1 completes the transmission followed by a EOT control word (t6). After receipt by the resource controller of the EOT control word (t6) an enable command is sent to the next group of transmitters in the index sequence (group B) followed by the receipt of a request to talk control word (t7 to t8) by the resource controller from mobile 3 within group B.

At time t8, in the absence of a call-end signal or before the end of the repeater hang time, mobile 2 presses the PTT button and is able to access the resource. Mobile 2 transmits an audio message (t8 to t9). At time t9 mobile 2 completes the message and transmits a call-end message word (t9). The resource controller transmits an enable command to all groups. Mobile 4 now transmits a resource request. Mobile 4 is now placed into the request queue ahead of Mobile 3 because of the earlier PTT activation.

After time t11 no further requests are allowed and the request receiving period ends. At time t11 the resource controller then transmits a resource grant to the next unit (and associated target group C) within the request queue (mobile 4). Mobile 4 then transmits a message followed by call-end at time t14 followed by allocation of the resource to mobile 3.

In one embodiment of the invention a priority request button (62, FIG. 3) is provided for priority service requests. Activation of the priority request button (62) immediately over-rides the disable switch (59) on the transmitter and a resource request is transmitted even though the resource may be allocated to another communication group. If the priority resource request is received by the resource controller then the current allocation is terminated and the resource immediately granted to the priority requestor.

If an acknowledgement is not received from the resource controller (11) then the unit waits for an EOT message from the transmitting communication unit before transmitting another request. Since upon receipt of the EOT message the resource controller has not yet transmitted an enable command to the next group in the index sequence a clear inbound channel exists for the priority requestor. Access is immediately provided upon receipt of a priority service request by the resource controller (11).

What is claimed is:

1. A resource allocation system for providing access to a communication resource, such resource allocation system comprising;
   A. a plurality of communication groups each comprising a plurality of communication units, each communication unit having a transmitter and a receiver;
   B. at least one communication group of the plurality of communication groups having a requesting communication unit;
   C. a resource controller;
   D. means operably coupled to the resource controller for selectively enabling the at least one communication group, allowing the requesting communication unit of the at least one communication group to transmit a resource request to the resource controller on the communication resource;
   E. memory means within the resource controller for maintaining a request queue for requesting communication units;
   F. means for allocating at least a portion of the communication resource to a first requesting communication unit in the request queue;
   G. means for disabling the transmitters of communication units of the plurality of communication groups, exclusive of the first requesting communication unit, upon allocation of the communication resource; and
   H. means for transmitting a request queue position to the at least one requesting communication unit over at least part of the allocated communication resource.

2. In a resource allocation system providing access to a communication resource by a plurality of communication groups, each with a plurality communication units, each communication unit having a transmitter and a receiver, a method of allocating the communication resource to communication units requesting access, the method comprising the steps of;
   A. sequentially enabling the plurality of communication groups to transmit requests to a resource controller;
   B. receiving a resource request from at least one requesting communication unit;
   C. entering the at least one communication unit into a request queue;
   D. allocating at least a portion of the communication resource to a first requesting communication unit in the request queue;
   E. disabling the transmitters on the plurality of communication groups, exclusive of the first requesting communication unit; and
   F. transmitting a request queue position to the at least one requesting communication unit over at least part of the allocated communication resource.

* * * * *